United States Patent [19]

Matsuura et al.

[11] 4,412,042
[45] Oct. 25, 1983

[54] PROCESS FOR PREPARING POLYOLEFINS CROSS-LINKED BY SILANE LINKAGE

[75] Inventors: Kazuo Matsuura, Tokyo; Noboru Yamaoka, Yokohama; Mituji Miyoshi, Fujisawa, all of Japan

[73] Assignee: Nippon Oil Company, Limited, Tokyo, Japan

[21] Appl. No.: 356,004

[22] Filed: Mar. 8, 1982

[30] Foreign Application Priority Data

Mar. 19, 1981 [JP] Japan .................................. 56-38758

[51] Int. Cl.³ .................. C08F 255/02; C08F 255/04; C08F 255/08; C08F 255/10
[52] U.S. Cl. .................................. 525/260; 525/262; 525/263; 525/265; 525/288; 525/326.5; 525/333.7; 525/342; 526/125; 526/348; 526/348.6; 526/352; 526/352.2
[58] Field of Search ............... 525/342, 288, 260, 262, 525/263, 265

[56] References Cited

U.S. PATENT DOCUMENTS 3,646,155  2/1972  Scott .................................. 525/288
4,247,667  1/1981  Nojiri et al. .......................... 525/342

Primary Examiner—Stanford M. Levin
Attorney, Agent, or Firm—Jordan and Hamburg

[57] ABSTRACT

The present invention provides an improved process for preparing a polyolefin cross-linked by silane linkage by contacting a polyolefin modified with silane with water in the presence of a silanol condensation catalyst, the improvement comprising said polyolefin modified with silane being a reaction product produced by reacting an ethylene α-olefin copolymer having a density of from 0.850 to 0.910 with a silane compound in the presence of a free radical generating agent, said ethylene α-olefin copolymer being prepared by copolymerizing ethylene with an α-olefin having 3 to 12 carbon atoms in a vapor phase with substantially no solvent present and in the presence of a catalyst comprising an organoaluminum compound and a solid substance containing magnesium, and a metal selected from the group consisting of titanium, vanadium and mixture thereof.

18 Claims, No Drawings

PROCESS FOR PREPARING POLYOLEFINS CROSS-LINKED BY SILANE LINKAGE

BACKGROUND OF THE INVENTION

1. Field of the Invention

The present invention relates to a process for the preparation of a polyolefin cross-linked by silane linkage.

2. Prior Art

In the prior art technology, cross-linked polyolefins have been prepared chiefly by cross-linking polyolefins using organic peroxides. However, in recent years, it becomes a current practice to cross-link polyolefins using silane compounds. Although this known silane cross-linking method is advantageous from the industrial standpoint of view because the equipment required for the cross-linking step is considerably simplified, the properties of the cross-linked polyolefins prepared through the known silane cross-linking method are inferior to those of the polyolefins cross-linked by the use of organic peroxides. In detail, the polyolefins cross-linked by the use of silane compounds can hardly satisfy the required heat resistant property and required elongation concurrently, since the reduction in elongation of the polyolefins cross-linked through the silane cross-linking method is greater than that of the polyolefins cross-linked by the use of organic peroxides.

OBJECTS AND SUMMARY OF THE INVENTION

An object of this invention is to provide a process for preparing a polyolefin cross-linked by silane linkage, whereby a cross-linked polyolefin excellent both in heat resistant property and in elongation property can be prepared.

Another object of this invention is to provide a process for preparing a polyolefin cross-linked by silane linkage, whereby a cross-linked polyolefin high in mechanical strength can be prepared.

A further object of this invention is to provide a process for preparing a polyolefin cross-linked by silane linkage, whereby a cross-linked polyolefin improved in moldability can be prepared.

A still further object of this invention is to provide a process for preparing a polyolefin cross-linked by silane linkage, whereby a cross-linked polyolefin reduced in permanent elongation percentage can be prepared.

The present invention provides an improved process for preparing a polyolefin cross-linked by silane linkage by contacting a polyolefin modified with silane with water in the presence of a silanol condensation catalyst, the improvement comprising said polyolefin modified with silane being a reaction product produced by reacting an ethylene/α-olefin copolymer having a density of from 0.850 to 0.910 with a silane compound in the presence of a free radical generating agent, said ethylene/α-olefin copolymer being prepared by copolymerizing ethylene with an α-olefin having 3 to 12 carbon atoms in a vapor phase with substantially no solvent present and in the presence of a catalyst comprising an organoaluminum compound and a solid substance containing magnesium, and a metal selected from the group consisting of titanium, vanadium and mixtures thereof.

DESCRIPTION OF THE INVENTION

In the present invention, an ethylene/α-olefin copolymer is modified with a silane compound. The ethylene/α-olefin copolymer used in this invention is a soft or semihard ethylene/α-olefin copolymer having a density of from 0.850 to 0.910, preferably from 0.860 to 0.900, and being prepared by copolymerizing ethylene with an α-olefin having 3 to 12 carbon atoms in a vapor phase with substantially no solvent present and in the presence of a catalyst comprising an organoaluminum compound and a solid substance containing magnesium and at least one of titanium and vanadium.

The cross-linked polyolefin having excellent properties, the preparation of which is intended by this invention, cannot be prepared if the density of the used copolymer is out of the range as defined above.

The step for the preparation of the ethylene/α-olefin copolymer used in this invention will now be described.

The catalyst used in this step is a combination of an organoaluminum compound and a solid substance containing magnesium and at least one of titanium and vanadium. The solid substance is prepared by reacting a compound containing at least magnesium with a titanium compound and/or a vanadium compound. Examples of the catalyst include the combinations of a titanium compound and/or a vanadium compound combined with or carried on an inorganic solid substance containing magnesium by the known methods. Examples of the inorganic solid substance containing magnesium include metallic magnesium, magnesium hydroxide, magnesium carbonate, magnesium oxide and magnesium chloride, and double salts, double oxides, carbonates, chlorides or hydroxides containing magnesium and at least one selected from the group consisting of silicon, aluminum and calcium. The products obtained by reacting the aforementioned magnesium-containing solid substances with oxygen-containing compounds, sulfur-containing compounds, aromatic hydrocarbons or halogen-containing compounds may be combined with the titanium compound and/or vanadium compound.

Examples of the aforementioned oxygen-containing compound are water, organic oxygen-containing compounds including alcohols, phenols, ketones, aldehydes, carboxylic acid, esters, polysiloxanes and acid amides, and inorganic oxygen-containing compounds including alkoxides and oxychlorides of metals of the Groups I-VIII of the Periodic Table such as sodium, magnesium, aluminium, boron, silicon and phosphorus. Examples of the sulfur-containing compound are organic sulfur-containing compounds including thiols and thioethers, and inorganic sulfur-containing compounds including sulfur dioxide, sulfur trioxide and sulfuric acid. Examples of the aromatic hydrocarbon include a variety of monocyclic and polycyclic aromatic hydrocarbons such as benzene, toluene, xylene, anthracene and phenanthrene. Examples of the halogen-containing compounds are chlorine, hydrogen chloride, chlorides of metals and organic halides.

Examples of the titanium and/or vanadium compounds include halides, alkoxyhalides, alkoxides and halogenated oxides of titanium and vanadium. compounds of tetravalent titanium and compounds of trivalent titanium may preferably be used. Specific examples of the compounds of tetravalent titanium include those represented by the general formula of $Ti(OR)_nX_{4-n}$, wherein R is an alkyl, aryl or aralkyl group having 1 to 20 carbon atoms, X is a halogen atom and n is indicated by $0 \leq n \leq 4$. The representative examples of the compounds are titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium and tetraphenoxy titanium. Examples of the compounds of trivalent titanium include titanium trihalides obtained by reducing titanium tetrahalides, such as titanium tetrachloride and titanium tetrabromide, with hydrogen, aluminium, titanium or organometallic compounds of the metals of the Groups I to III of the Periodic Table. Other examples of the compounds of trivalent titanium include those obtained by reducing halogenated alkoxides of tetravalent titanium represented by the general formula of $Ti(OR)_m X_{4-m}$, wherein R is an alkyl, aryl or aralkyl group having 1 to 20 carbon atoms, X is a halogen atom and m is indicated by $0<m<4$, with organometallic compounds of the metals of the Groups I to III of the Periodic Table. Examples of the vanadium compounds include compounds of tetravalent vanadium such as vanadium tetrachloride, vanadium tetrabromide and vanadium tetraiodide, compounds of pentavalent vanadium such as vanadium oxytrichloride and orthoalkyl vanadates, and compounds of trivalent vanadium such as vanadium trichloride and vanadium triethoxide.

Amongst the titanium compounds and the vanadium compounds, compounds of tetravalent titanium are particularly preferred.

Preferable examples of the catalyst used at the step for the preparation of the ethylene/α-olefin copolymer include the combinations of organoaluminum compounds with solid substances, such as a reaction product of MgO, RX and a titanium compound as disclosed in Japanese Patent Publication No. 3514/1976, a reaction product of $Mg_2SiCl_4$, ROH and a titanium compound as disclosed in Japanese Patent Publication No. 23864/1975, a reaction product of $MgCl_2$, $Al(OR)_n X_{3-n}$ and a titanium compound as disclosed in Japanese Patent Publication Nos. 152/1976, 7599/1976, 15111/1976 and 15315/1977, a reaction product of $MgCl_2$, $SiCl_4$, ROH and a titanium compound as disclosed in Unexamined Japanese Patent Publication No. 106581/1974, a reaction product of $MgCl_2$, $Si(OR)_m X_{4-m}$ and a titanium compound as disclosed in Unexamined Japanese Patent Publication Nos. 119979/1974 and 28889/1976, a reaction product of $Mg(OOCR)_2$, $Al(OR)_3$ and a titanium compound as disclosed in Japanese Patent Publication No. 11710/1977, a reaction product of Mg, $POCl_3$ and a titanium compound as disclosed in Japanese Patent Publication No. 153/1976 and a reaction product of $MgCl_2$, AlOCl and a titanium compound as disclosed in Japanese Patent Publication No. 15316/1679. In the chemical formula referred to above, R represents an organic residue group having 1 to 20 carbon atoms, X represents a halogen atom, n is indicated by $0<n\leq 3$ and m is indicated by $0\leq m\leq 4$.

Other examples of the catalyst used in this step include combinations or organoaluminum compounds with solid substances comprising any of the reaction products of organomagnesium compounds, such as so-called Grignard's reagents, and a titanium and/or vanadium compound. Examples of the organomagnesium compounds usable for this purpose include organomagnesium compounds represented by the general formulae of RMgX, $R_2Mg$ and RMg(OR), wherein R is an organic residue group having 1 to 20 carbon atoms and x is a halogen atom, complexes thereof with ethers, and modification products of the aforementioned organomagnesium compounds modified with a variety of other organometallic compounds including organosodium, organolithium, organopotassium, organoboron, organocalcium and organozinc compounds.

More specific examples of the aforementioned catalyst compositions are the combinations of organoaluminum compounds with solid substances, such as a reaction product of RMgX and a titanium compound as disclosed in Japanese Patent Publication No. 39470/1975, a reaction product of RMgX, a phenol and a titanium compound as disclosed in Japanese Patent Publication No. 12954/1979 and a reaction product of RMgX, a halogenated phenol and a titanium compound as disclosed in Japanese Patent Publication No. 12953/1979.

In the catalyst composition as aforementioned, the titanium and/or vanadium compounds may be used in the form of adducts of these metals to organic carboxylic acid esters, or the aforementioned inorganic solid substances may be used after being contacted with organic carboxylic acid esters. Otherwise, the organoaluminum compounds may be used in the form of adducts thereof to organic carboxylic acid esters. Further, any of the aforementioned catalyst compositions may be prepared in the presence of an organic carboxylic acid ester.

A variety of aliphatic, alicyclic and aromatic carboxylic acid esters may be used as the organic carboxylic acid esters, the preferable being esters of aromatic carboxylic acids having 7 to 12 carbon atoms. Specific examples of the preferable esters are alkylesters of benzoic acid, anisic acid and toluic acid, such as methyl- and ethylesters of these carboxylic acids.

Specific examples of organoaluminum compounds preferably used in combination with the aforementioned solid substances include organoaluminum compounds represented by the general formulae of $R_3Al$, $R_2AlX$, $RAlX_2$, $R_2AlOR$, $RAl(OR)X$ and $R_3Al_2X_3$, wherein R is an alkyl, aryl or aralkyl group having 1 to 20 carbon atoms, X is a halogen atom and the groups represented by R may be the same or different when two or more groups are included in the general formulae set forth above; and representative compounds are triethylaluminum, triisopropylaluminum, tri-tert-butylaluminum, tri-sec-butylaluminum, trihexylaluminum, trioctylaluminum, diethylaluminum chloride, ethylaluminum sesquichloride and mixtures thereof.

Although the content of the organoaluminum compound contained in the catalyst is not particularly critical, the organoaluminum compound may be combined with the titanium and/or vanadium compound in the ratio of from 0.1 to 1000 times as large as that of the titanium and/or vanadium compound in the molar ratio.

Moreover, the aforementioned catalyst composition may be allowed to contact with an α-olefin prior to the vaporphase polymerization step to improve the catalytic activity thereof in the polymerization reaction considerably and to further stabilize the operation at the polymerization step when compared to the case where an untreated catalyst is used. Although a variety of α-olefins may be used for this purpose, preferable α-olefins are those having 3 to 12, more preferably 3 to 8, carbon atoms. As the specific examples of the α-olefins which may be used for this purpose, there may be mentioned propylene, butene-1, pentene-1, 4-methylpentene-1, heptene-1, hexene-1, octene-1, decene-1, dodecene-1 and mixtures thereof. The conditions for this pre-contact treatment, e.g. the temperature and the time, may be determined within wide ranges; and, for example, the catalyst composition may be allowed to contact with an α-olefin at a temperature of from 0° C. to 200° C., preferably 0° C. to 110° C., for 1 minute to 24 hours. The quantity of the α-olefin used for this pretreatment may be varied within a wide range, and 1 gram of the aforementioned solid substance may be pre-treated with generally about 1 to 50,000 grams, preferably about 5 to 30,000 grams, of the selected α-olefin, so that 1 to 500 grams of α-olefin per 1 gram of the aforementioned solid substance is consumed. Although the pressure at the pre-treatment operation may be determined arbitrarily, it is preferred that the pre-treatment be effected under a pressure of from −(minus) 1 to 100 kg/cm$^2$.G.

The catalyst composition may be pre-treated with an α-olefin after all of the used organoaluminum compound is combined with the aforementioned solid substance; or alternatively a portion of the used organoaluminum compound is combined with the aforementioned solid substance and the resultant mixture is allowed to contact with an α-olefin vapor, the residing portion of the used organoaluminum compound being added separately to the pre-treated mixture at the vapor phase polymerization step. The pre-treatment operation for contacting the catalyst composition with a selected α-olefin may be effected in the presence of hydrogen gas or any other inert gases, such as nitrogen, argon or helium, without inconvenience.

The polyolefins which are modified with a silane compound according to the process of this invention should be essentially the copolymers having a density ranging within the defined range and being prepared by copolymerizing ethlene with α-olefins in the presence of the aforementioned catalyst composition comprising an organoaluminum compound and a solid substance containing magnesium and a titanium and/or vanadium compound. Specific examples of the α-olefins which may be used for the preparation of copolymers include propylene, butene-1, pentene-1, 4-methylpentene-1, heptene-1, hexene-1, octene-1, decene-1 and dodecene-1.

The copolymerization is effected in a vapor phase in which substantially no solvent is present. Any of the known reactors including a fluidized bed reactor and a reactor provided with an agitator may be used.

The copolymerization may be effected at a temperature of generally from 0° C. to 110° C., preferably 20° C. to 80° C., and at a pressure of generally from the atmospheric pressure to 70 kg/cm$^2$.G, preferably 2 to 60 kg/cm$^2$.G. The molecular weight of the resultant copolymer may be controlled by varying the copolymerization reaction temperature, the molar ratio of the used catalyst and the quantities of the used comonomers. However, the molecular weight of the resultant copolymer can be controlled more effectively by the addition of hydrogen in the copolymerization system. This copolymerization step may be, of course, divided into two or more separate stages operated under different reaction conditions, for example, operated at different temperature or differentiated in concentration of hydrogen or concentrations of comonomers.

It was really a surprising and unexpected result that a cross-linked polyolefin having excellent properties had been synthesized by modifying the polyolefin specifically defined in the appended claims and prepared by copolymerizing ethylene with an α-olefin having 3 to 12 carbon atoms in a vapor phase with substantially no solvent present and in the presence of the aforementioned catalyst comprising an organoaluminum compound and a solid substance containing magnesium and at least one of titanium and vanadium. A cross-linked polyolefin having excellent properties comparable to the surprisingly improved properties of the cross-linked polyolefin prepared in accordance with the process of this invention cannot be prepared when any of the known polyolefins is modified with a silane compound to be cross-linked. The known polyolefins including a high pressure process polyolefin and the polyolefins prepared by the medium and low pressure solution polymerization processes were cross-linked using a silane compound to reveal that the properties of the thus prepared polyolefins were inferior to the properties of the polyolefin prepared by the process of this invention while using the polyolefin or ethylene/α-olefin copolymer specifically defined in the appended claims.

In the step of modifying the polyolefin or ethylene/α-olefin copolymer, the known method may be adopted. In detail, any one of the polyolefins specifically defined in the appended claims may be reacted with a silane compound in the presence of a free radical generating agent followed by contacting the thus modified polyolefin with water in the presence of a silanol condensation catalyst, whereby the intended product, i.e. a polyolefin cross-linked by silane linkage, is produced.

The silane compound which may be used to react with the specifically defined polyethylene in the process of this invention include the compounds represented by the general formula of SiRR'Y$_2$, wherein R is an olefinic, unsaturated, monovalent hydrocarbon or hydrocarbon-oxy group, Y is a hydrolyzable organic group and R' is the same as R or Y. Examples of the group R included in the aforementioned general formula SiRR'Y$_2$ are vinyl group, allyl group, butenyl group, cyclohexenyl group and cyclopentadienyl group. Examples of the group Y include alkoxy groups, such as methoxy group, ethoxy group and butoxy group, acyloxy groups, such as formyloxy group, acetoxy group and propionoxy group, oxime groups, alkylamino groups and arylamino groups. The most preferred silane compounds are vinyltrimethoxysilane and vinyltriethoxysilane.

The amount of the silane compound added for modification may be varied depending on the conditions for the modification reaction or the desired degree of modification. In general, 0.1 to 50 wt%, preferably 0.5 to 10 wt%, of the silane compound, based on the weight of the polyolefin subjected to modification, may be used.

Preferable free radical generating agents include organic peroxides and peresters, the specific examples thereof being benzoyl peroxide, dichlorobenzoyl peroxide, dicumyl peroxide, di-tert-butyl peroxide, 2,5-di(-peroxybenzoate)hexyne-3, 1,3-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tertbutyl perbenzoate, and azo-compounds such as azobisisobutylonitrile and dimethylazodiisobutylate.

The most preferable free radical generating agent is dicumyl peroxide.

The preferred amount of the free radical generating agent used in the modification step ranges from 0.05 to 0.5 wt%, more preferably 0.1 to 0.2 wt%, based on the weight of the polyolefin subjected to modification.

The polyolefin may be modified with the silane compound by mixing the polyolefin with the silane compound and the free radical generating agent in a suitable reactor to initiate the reaction. The modification reaction may be effected at a temperature of not lower than 100° C. and lower than the temperature at which the used polyolefin decomposes. The preferable reaction temperature ranges within 120° C. to 250° C. It is preferred that the reaction be terminated within 10 minutes, more preferably within 2 to 5 minutes. Any known reactors may be used as the reactor in which the modification reaction is effected. Examples of the usable reactors are an extruder, Banbury's mixer and roller mill.

The thus obtained polyolefin modified with silane is cross-linked by a known method. More specifically, the thus obtained polyolefin modified with silane is molded and then contacted with water in the presence of a silanol condensation catalyst to react with water, whereby a cross-linked polyolefin is prepared.

Examples of the silanol condensation catalyst which may be used for this purpose include salts of carboxylic acids, such as dibutyltin dilaurate, tin acetate, stannous octanate (stannous caprylate), lead naphthenate, zinc caprylate, iron 2-ethylhexanate and cobalt naphthenate, organometallic compounds including titanium acid esters or chelate compounds of titanium acid, such as tetrabutyl titanate, tetranonyltitanate and bis-(acetylacetonitrile)diisopropyltitanate, organic bases such as ethylamine, hexylamine, dibutylamine and pyridine, and acids including inorganic acids and fatty acids. The preferred silanol condensation catalysts are organotin compounds, such as dibutyltin dilaurate, dibutyltin diacetate and dibutyltin dioctoate.

It is recommended that the silanol condensation catalyst is admixed to the polyolefin modified with silane before the polyolefin is contacted with water. Namely, a silanol condensation catalyst may be added to the reaction mixture before, intermediately or after the polyolefin is reacted with a silane modification compound.

The silanol condensation catalyst may be added in an amount of from 0.01 to 0.5 wt%, preferably 0.02 to 0.2 wt%, based on the weight of the polyolefin.

Although it suffices to utilize the moisture normally contained in the atmosphere in order to initiate the cross-linking reaction, the reaction mixture added with a silanol condensation catalyst may be put into water or hot water or may be exposed to steam in order to increase the reaction velocity of the cross-linking reaction.

In the process of this invention, other additives including, for example, carbon black, talc, calcium carbonate, foaming agents, lubricants, antioxidants, stabilizers inhibiting deterioration by ultraviolet rays, stabilizers inhibiting deterioration by heavy metals, coloring agents and stabilizers against electric voltage, may be added.

The cross-linked polyolefin prepared in accordance with the process of this invention from the polyolefin specifically defined in the appended claims may be mixed with any of polyolefins prepared through other processes, provided that the amount of the other type polyolefin is not so large as to impair the advantageous properties of the cross-linked polyolefin prepared by the process of this invention. As the examples of other type polyolefins which may be added within the critical limitation, there may be mentioned high pressure process polyethylene, an ethylene/vinyl acetate copolymer, polyethylenes prepared through medium pressure or low pressure solution polymerization processes, and other polyolefins such as polypropylene. It is generally desirable that 100 parts, by weight, or less of such a polyolefin is added to 100 parts, by weight, of the polyolefin used in the process of the present invention.

The polyolefin cross-linked by silane linkage, as prepared through the process of this invention, has excellent properties such that the permanent elongation percentage thereof is decreased in addition to the improvements in heat resistant property, physical strengths and elongation property. Furthermore, the polyolefin prepared through the process of this invention has remarkably improved moldability.

The cross-linked polyolefin prepared through the process of this invention is suited for use as a coating material for the production of electric wire or cable, and also conveniently used to produce a pipe or sheet.

EXAMPLES OF THE INVENTION

The present invention will be described more specifically by referring to specific examples thereof. However, it should be noted that the present invention is not limited only to the following examples.

EXAMPLE 1

1000 g of magnesium chloride substantially free of water, 50 g of 1,2-dichloroethane and 170 g of titanium tetrachloride were mixed together to obtain a mixture. The mixture was subjected to ball-milling in a nitrogen atomosphere at the room temperature for 16 hours to obtain a solid substance containing 35 mg of titanium in 1 g of the solid substance.

A stainless steel autoclave was used as the reactor in which vapor phase copolymerization of ethylene and butene-1 was effected. The autoclave was incorporated into a looped reactor system provided with a blower, a flow rate adjusting valve and a dry cyclone, while the temperature in the autoclave was controlled by flowing warm water through a jacket of the autoclave.

The temperature in the autoclave, i.e. the copolymerization reaction temperature, was set to 80° C., and 250 mg/hr of the aforementioned solid substance and 50 millimols/hr of triethylaluminum were fed into the autoclave. Ethylene and butene-1 were supplied into the autoclave while adjusting the composition of the reaction mixture by the blower so that the molar ratio of ethylene to butene-1 was maintained to 65 to 25. Ethylene and butene-1 were copolymerized while supplying hydrogen so that 10% of the total pressure of the reaction mixture was shared by the thus supplied hydrogen gas.

Resultant ethylene/butene-1 copolymer had a melt index of 2.0 and a density of 0.870.

Then, 100 parts by weight of the thus prepared ethylene/butene-1 copolymer was added with 2 parts by weight of vinyltrimethoxysilane and 0.15 parts by weight of dicumyl peroxide to obtain a mixture. The mixture was extruded through a 65 mm$\phi$ extruder maintained at 180° C. to obtain strands which were cut into pellets. The residence time of the resinous mixture in the extruder was set to 100 seconds by rotating the screw of the extruder at 45 rpm. 95 parts by weight of the pelletized mixture was added with 5 parts, by weight of a pelletized catalyst master batch. The pelletized catalyst master batch was prepared by mixing 100 parts, by weight, of the aforementioned ethylene/butene-1 copolymer with 1 part by weight of dibutyltin dilaurate and 2 parts by weight of 4,4'-thiobis(6-tert-butyl-4-hydroxybenzyl) followed by pelletization. The thus obtained admixture was re-pelletized using a 65 mm$\phi$ extruder maintained at an extrusion temperature of 230° C. A plate was molded by pressing the re-pelletized admixture at 200° C. The thus molded plate was subjected to cross-linking operation by dipping the plate for six hours in water heated to 100° C. The appearance of the cross-linked product was excellent. The properties of the cross-linked product are shown in Table 1.

EXAMPLE 2

Ethylene and propylene were copolymerized similarly to Example 1, except that the gaseous composition supplied into the autoclave was composed of 45 mol% of ethylene and 40 mol% of propylene and 15% of the total pressure of the reaction mixture was shared by hydrogen. A melt index of the formed ethylene/propylene copolymer was 3.4 and a density thereof was 0.868.

A cross-linked product was prepared generally in accordance with the procedures as set forth in Example 1, except that the ethylene/propylene copolymer having a melt index of 3.4 and a density of 0.868 was used in place of the ethylene/butene-1 copolymer having the melt index of 2.0 and the density of 0.870. The properties of the cross-linked product are shown in Table 1.

EXAMPLE 3

830 g of magnesium chloride, 120 g of anthracene and 180 g of titanium tetrachloride were subjected to ball-milling in accordance with a procedure similar to Example 1 to obtain a solid substance. The solid substance contained 40 mg of titanium in 1 g thereof.

Using the same reactor system as used in Example 1, ethylene and propylene were subjected to continuous copomerization at 80° C., while supplying the aforementioned solid substance at a rate of 500 mg/hr and triisobutylaluminum at a rate of 150 milimols/hr and controlling the molar ratio of ethylene:propylene:hydrogen in the vapor phase to 43:42:15.

The formed ethylene/propylene copolymer had a melt index of 2.3, a bulk density of 0.398 and a density of 0.880.

Then, a cross-linked product was prepared generally in accordance with the procedures as set forth in Example 1, except that the ethylene/propylene copolymer having the melt index of 2.3 and the density of 0.880 in place of the ethylene/butene-1 copolymer used in Example 1. The properties of the obtained product are shown in Table 1.

EXAMPLE 4

830 g of magnesium chloride, 50 g of aluminum oxychloride and 170 g of titanium tetrachloride were subjected to ball-milling in accordance with a procedure similar to Example 1 to obtain a solid substance containing 41 mg of titanium per 1 g of the solid substance.

Ethylene and butene-1 were copolymerized similarly to Example 1, except that the molar ratio of ethylene:butene-1:hydrogen in the gaseous mixture supplied for vapor phase copolymerization was controlled to 65:25:10, and that the aforementioned solid substance was supplied at a rate of 200 mg/hr and triethylaluminum was supplied at a rate of 50 millimols/hr.

The formed ethylene/butene-1 copolymer had a melt index of 2.9, a bulk density of 0.403 and a density of 0.863.

Then a cross-linked product was prepared generally in accordance with the procedures as set forth in Example 1, except that the ethylene/butene-1 copolymer having the melt index of 2.9 and the density of 0.863 was used in place of the ethylene/butene-1 copolymer used in Example 1. The properties of the obtained product are shown in Table 1.

Comparative Example 1

A cross-linked product was prepared in accordance with a general procedure similarly to Example 1, except that a low density polyethylene having a melt index of 1.3 and a density of 0.921 and prepared by the known high pressure polymerization process was used.

The cross-linked product obtained was unsatisfactorily small in elongation percentage, and increased in permanent elongation percentage when subjected to 100% elongation. Moreover, the elasticity of the product was inferior. The properties of the product are shown in Table 1.

Comparative Example 2

A cross-linked product was prepared in accordance with a general procedure similar to Example 1, except that a high density polyethylene having a melt index of 1.8 and a density of 0.947 and prepared by the known low pressure slurry polymerization process using a Ziegler catalyst was used.

The cross-linked product was, similarly to Comparative Example 1, small in elongation percentage and considerably increased in permanent elongation percentage. The properties of the product are shown in Table 1.

TABLE 1

| | Properties of Cross-Linked Product* | | | |
|---|---|---|---|---|
| | Yield Strength (kg/cm$^2$) | Tensile Strength (kg/cm$^2$) | Elongation (%) | Permanent Elongation Percentage after Subjected to 100% Elongation (%) |
| Example 1 | 63 | 228 | 610 | 11 |
| Example 2 | 61 | 218 | 580 | 9 |
| Example 3 | 58 | 219 | 650 | 13 |
| Example 4 | 66 | 230 | 600 | 7 |
| Comp. Ex. 1 | 42 | 196 | 310 | 73 |
| Comp. Ex. 2 | 76 | 250 | 250 | 86 |

*Note:
Determined generally in accordance with the JIS k-6301 Method.

Although the present invention has been described with reference to specific examples thereof, it should be understood that various modifications and variations may be easily made by those skilled in the art without departing from the spirit of the invention. It is, thus, intended to include all such modifications and variations within the wide scope of the invention as defined in the appended claims.

What is claimed is:

1. In a process for preparing a polyolefin crosslinked by silane linkage by contacting a polyolefin modified with silane with water in the presence of a silanol condensation catalyst, an improved process wherein said polyolefin modified with silane is a reaction product produced by reacting an ethylene/α-olefin copolymer having a density of from 0.850 to 0.910 with a silane compound in the presence of a free radical generating agent, said ethylene/α-olefin copolymer being prepared by copolymerizing ethylene with an α-olefin having 3 to 12 carbon atoms in a vapor phase with substantially no solvent present and in the presence of a catalyst comprising an organoaluminum compound and a solid substance containing magnesium and a metal selected from the group consisting of titanium, vanadium and mixtures thereof.

2. A process according to claim 1, wherein said ethylene/α-olefin copolymer has a density of from 0.860 to 0.900.

3. A process according to claim 1, wherein said solid substance is prepared by reacting a compound containing at least magnesium with a compound selected from the group consisting of a titanium compound, a vanadium compound and mixtures thereof.

4. A process according to claim 3, wherein said compound containing at least magnesium is an inorganic solid substance selected from the group consisting of metallic magnesium, magnesium hydroxide, magnesium carbonate, magnesium oxide and magnesium chloride, double salts, double oxides, carbonates, chlorides and hydroxides containing magnesium and at least one selected from the group consisting of silicon, aluminium and calcium.

5. A process according to claim 4, wherein said inorganic solid substance is reacted with a compound selected from the group consisting of an oxygen-containing compound, a sulfur-containing compound, aromatic hydrocarbons and a halogen-containing compound.

6. A process according to claim 5, wherein said oxygen-containing compound is selected from the group consisting of water, alcohols, phenols, aldehydes, carboxylic acids, esters, polysiloxanes and acid amides and alkoxides and oxychlorides of metals of the Groups I to VIII of the Periodic Table.

7. A process according to claim 5, wherein said sulfur-containing compound is selected from the group consisting of thiols, thioethers, sulfur dioxide, sulfur trioxide and sulfuric acid.

8. A process according to claim 5, wherein said aromatic hydrocarbon is selected from the group consisting of benzene, toluene, xylene, anthracene and phenanthrene.

9. A process according to claim 5, wherein said halogen-containing compound is selected from the group consisting of chlorine, hydrogen chloride, chlorides of metals and organic halides.

10. A process according to claim 3, wherein said titanium compound is a tetravalent titanium compound.

11. A process according to claim 3, wherein said titanium compound is a trivalent titanium compound.

12. A process according to claim 3, wherein said compound containing at least magnesium is an organomagnesium compound represented by the general formula selected from the group consisting of RMgX, $R_2Mg$ and RMg(OR) wherein R is an organic residue group having 1 to 20 carbon atoms and X is a halogen atom.

13. A process according to claim 1, wherein said α-olefin is selected from the group consisting of propylene, butene-1, pentene-1, 4-methylpentene-1, heptene-1, hexene-1, octene-1, decene-1, dodecene-1 and mixtures thereof.

14. A process according to claim 1, wherein said ethylene/α-olefin copolymer is prepared by copolymerizing ethylene with said α-olefin at a temperature of from 0° C. to 110° C. and at a pressure of from the atmospheric pressure to 70 kg/cm$^2$.G.

15. A process according to claim 1, wherein said silane compound is a compound represented by the general formula of $SiRR'Y_2$, wherein R is an olefinic, unsaturated, monovalent hydrocarbon or hydrocarbonoxy group, Y is a hydrolyzable organic group and R' is the same as R or Y.

16. A process according to claim 15, wherein said group R is selected from the group consisting of vinyl, allyl, butenyl, cyclohexenyl and cyclopentadienyl groups, and said group Y is the one selected from the group consisting of alkoxy groups, acyloxy groups, oxime groups, alkylamino groups and arylamino groups.

17. A process according to claim 1, wherein said free radical generating agent is selected from the group consisting of benzoyl peroxide, dichlorobenzoyl peroxide, di-tert butyl peroxide, 2,5-di(peroxybenzoate)hexyne-3, 1,3-bis(tert-butylperoxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl perbenzoate, azoisobutyronitrile, dimethylazodisobyutylate and mixtures thereof.

18. A process according to claim 1, wherein said ethylene/α-olefin copolymer is reacted with said silane compound at a temperature of from 120° C. to 250° C. for a time of up to 10 minutes.

* * * * *